United States Patent

[11] 3,587,801

| [72] | Inventor | Robert J. Riner<br>Dayton, Ohio |
|---|---|---|
| [21] | Appl. No. | 860,995 |
| [22] | Filed | Sept. 25, 1969 |
| [45] | Patented | June 28, 1971 |
| [73] | Assignee | General Motors Corporation<br>Detroit, Mich. |

[54] VISCOUS FLUID CLUTCH
11 Claims, 4 Drawing Figs.

[52] U.S. Cl. .................................. 192/58,
 192/82
[51] Int. Cl. ...................................F16d 35/00,
 F16d 43/25
[50] Field of Search........................... 192/58, 58
 (A1) (A2), 82, 82 (TO)

[56] References Cited
UNITED STATES PATENTS

| 3,259,221 | 7/1966 | Godfrey | 192/58(A1) |
| 3,363,734 | 1/1968 | Sabat | 192/58(A1) |
| 3,463,282 | 8/1969 | Fujita et al | 192/58(A2) |

*Primary Examiner*—Allan D. Herrmann
*Attorneys*—Warren E. Finken, A. M. Heiter and John P. Moran

ABSTRACT: A viscous fluid clutch including relatively rotatable first and second drive members having a fluid shear space therebetween and which are cooperable with a fluid medium in the shear space to provide a shear-type fluid drive therebetween, an annular reservoir for at times storing the fluid medium, a temperature-responsive valve for controlling the flow of the fluid medium from the annular reservoir to the fluid shear space, unequally spaced and unequally radially positioned inlet ports between the reservoir and the fluid shear space for assuring a gradual increase in fan speed with increased temperature to both satisfy engine requirements and abate fan noise, and a cooperating annular cavity associated with the fluid shear space for compensating for manufacturing and assembly variations in fluid and/or reservoir volumes.

PATENTED JUN28 1971 3,587,801

INVENTOR.
Robert J. Riner
BY
John P. Moran
ATTORNEY

VISCOUS FLUID CLUTCH

This invention relates generally to fluid drive devices, and more particularly, to a fluid drive adapted to drive an accessory device, such as a cooling fan, for internal combustion engines.

Vehicle-cooling fans are generally belt driven from the engine crankshaft, and are operable at a fixed speed ratio with respect to the vehicle engine. It has been found desirable to vary the speed ratio of the fan with respect to the engine speed so that at low engine speed the fan will be running at a relatively high speed for maximum cooling and as the speed of the engine increases, such as when the vehicle is running in direct drive at road speeds, the ram air-cooling effect on the engine is increased and the necessity for fan cooling is diminished. The resultant lower fan speed eliminates excessive fan noise which otherwise could be disturbing to the occupants of the vehicle.

The device disclosed herein relates to an engine cooling fan mechanism wherein a viscous fluid, shear-type clutch is utilized to transmit power from the vehicle engine to the fan blade assembly.

An object of the invention is to provide improved means for effecting a gradual increase in fan speed with increased temperature, in order to satisfy particular engine requirements and to better control fan noise.

Another object of the invention is to provide improved means for compensating for manufacturing and assembly variations in fluid volume and/or reservoir chamber volume, while maintaining the above-described gradual rather than abrupt, increase in fan noise characteristic.

A more specific object of the invention is to provide a viscous shear fan drive having a housing including a finned rear wall, a front wall, a divider wall therebetween, an operating or working chamber formed between the rear and divider walls for receiving a clutch plate in viscous shear drive relation with the housing, an annular reservoir formed been the divider and front walls, a continuously open outlet formed in the divider wall and cooperating pump or dam means for forcing the fluid from the reservoir and through the outlet into the operating chamber, and a pair of temperature-controlled inlets formed in the divider wall between the operating chamber and the reservoir and spaced at different radial distances from the center of the clutch and at unequal circumferential locations around the divider wall for controlling fluid flow therethrough in a gradual manner, and an annular reservoir groove formed in the rear wall radially outwardly of the ridge and groove elements which make up the viscous shear drive for preventing an "overfill" of fluid from disturbing the "gradual-flow" process.

These and other objects and advantages will become apparent when reference is made to the following description and the accompanying drawings wherein.

Figure 1:
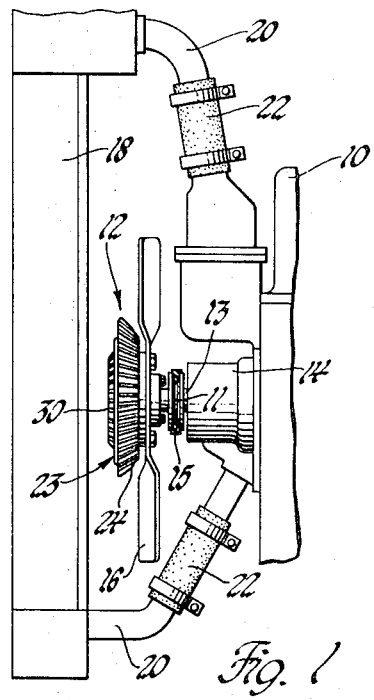
FIG. 1 is a fragmentary side elevational view of a radiator and engine having a viscous fluid clutch-driven cooling fan associated therewith.

Referring to the drawings in greater detail, FIG. 1 illustrates an engine 10 having a viscous fluid clutch 12 and a pulley 11 mounted on a drive shaft 13 extending from the conventional water pump 14, the pulley 11 being rotated by a V-belt 15 connected to the crankshaft (not shown) for driving a cooling fan 16 secured to the clutch 12. The fluid clutch 12 and the cooling fan 16 are located between the engine 10 and a radiator 18. The usual conduits 20 and associated hoses 22 communicate between radiator 18 and the engine 10 adjacent the water pump 14.

Figure 2:
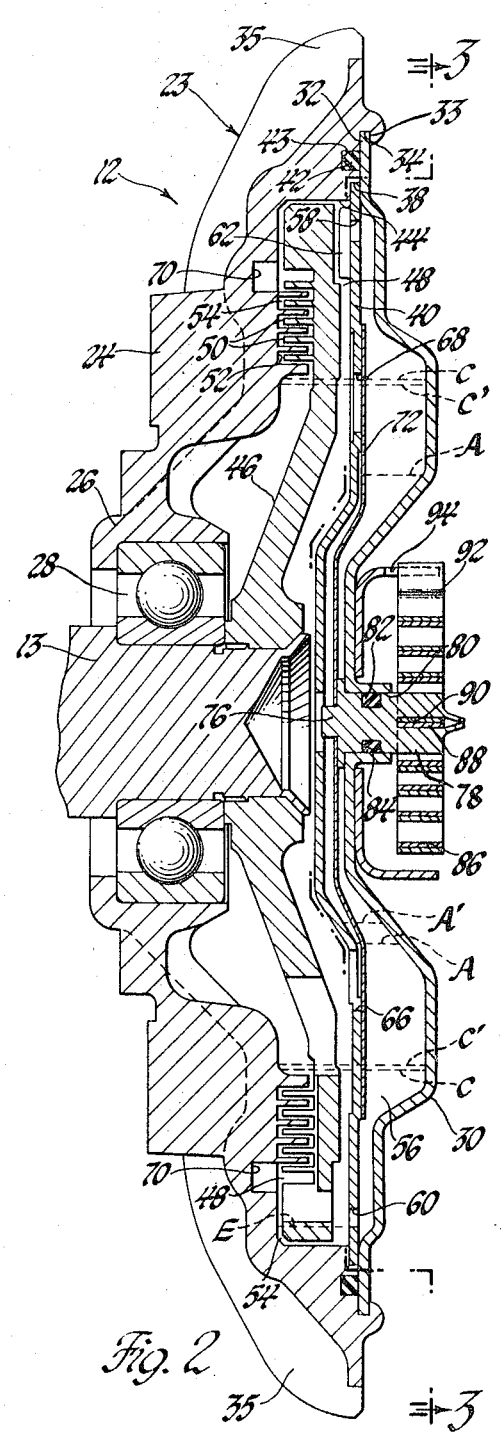
FIG. 2 is an enlarged cross-sectional view of a viscous fluid, shear-type clutch embodying the invention.

Referring now to FIG. 2, the fluid clutch 12 includes a housing 23 which includes a rear wall member 24 having a hub 26 which is rotatably mounted by a suitable bearing 28 on the drive shaft 13. The housing 23 further includes a cover member or front wall 30 which has an annular flat surface 32 formed adjacent its peripheral edge, the latter being confined by an annular lip 33 in an annular recess 34 formed in the housing 23. Cooling fins 35 are formed on the outer surface of the rear wall member 24. A second annular recess 38 is formed radially inward of the outer periphery of the annular recess 34. A divider wall 40 is confined adjacent its outer edge in the recess 38 by the cover member 30. A seal 42 is compressed in an annular groove 43 formed in the rear wall member 24 intermediate the outer edges of the annular recesses 34 and 38. A third annular deeper recess 44 is formed in the rear wall member 24 radially inward of the second annular recess 38. A clutch plate 46 is secured at its center by any suitable means to the drive shaft 13, the outer peripheral portion thereof being freely located in an operating or working chamber 48 formed by the third annular recess 44.

Adjacent portions of the clutch plate 46 and the rear wall member 24 are provided with torque-transmitting elements consisting of cooperating annular ridge and groove elements 50 and 52, respectively, with an intervening fluid shear space 54 therebetween to accommodate a viscous fluid as a torque-transmitting medium.

It may be noted in FIG. 2 that the front wall or cover member 30 includes an annular bend intermediate the centers and peripheral edges thereof which forms an annular reservoir 56 with the divider wall 40. Pump outlet openings 58 and/or 60 are formed through the divider wall 40 adjacent the pump or dam elements 62 and 64, respectively, formed on the divider wall 40, the openings 58 and 60 communicating between the operating chamber 48 and the annular reservoir 56. As illustrated, the pump element may consist of a circular boss 62 formed on the divider wall 40 by any suitable means, such as stamping, or it may be a rectangular-shaped or other-shaped member 64 secured to the divider wall 40, such as by welding. It is to be understood that, in some applications, one outlet and one pump element may be sufficient, while other applications may require two such pumping arrangements.

An annular reservoir groove 70, substantially wider than the individual grooves 52, is formed in the rear wall member 24 radially outwardly of the most radial outward groove 52, with the innermost wall thereof adjacent the most radial outward ridge member 50 formed on the clutch plate 46, for a purpose to be described.

A pair of inlet ports 66 and 68 are also formed in the divider wall 40, communicating between the annular reservoir 56 and the working chamber 48 radially inward of the pump elements 62 and 64 and the pump outlet openings 58 and 60. It may be noted in FIG. 3 that the inlet ports 66 and 68 are spaced at different radial distances from the center of the clutch 12 and are unequally spaced circumferentially. However, both are at times closed off by a valve member 72. The valve member 72 includes trailing edges 74 and is secured intermediate the ends thereof to a reduced diameter portion 76 of a center pin or shaft 78, which is rotatably mounted in a central opening 80 formed in the front wall or cover member 30. A seal ring 82 may be mounted in an annular groove 84 formed in the pin 78 within the central opening 80 to prevent leakage therepast. A helically wound, bimetallic thermostatic valve control element 86 is provided with an inwardly extending end portion 88 which is mounted in a transverse slot 90 formed in the pin 78. An outwardly extending end portion 92 of the bimetallic element 86 is secured to a post 94. With this arrangement, a change in ambient temperature either winds or unwinds the bimetallic element 86, resulting in rotation of the pin 78 and the valve member 72.

OPERATION

So long as the vehicle engine 10 (FIG. 1) is in operation, the drive shaft 13 and the associated clutch plate 46 (FIG. 2) will be driven by the pulley 11 operatively connected via the belt 15 to the crankshaft (not shown) at an appropriate speed ratio with respect to engine speed. The initial position of the temperature-responsive valve member 72 will be closed across the inlet openings 66 and 68 in the divider wall 40, and will remain closed so long as the engine is cold, thus preventing any flow of fluid from the annular reservoir 56 into the working chamber 48. Since the pump outlet openings 58 and/or 60 are always open, providing continuous communication between the working chamber 48 and the annular reservoir 56, fluid will be pumped therethrough by virtue of the pump elements 62 and 64 serving as dams or wipers, forcing the fluid to flow into the respective openings 58 and 60 and, thence, into the annular reservoir 56. The total volume of fluid is such that when the working chamber 48 is substantially empty, i.e., at a level designated by broken line E, FIG. 2, the fluid in the annular reservoir 56 will be held under the action of centrifugal force in the outer annular portion of the reservoir 56 with an inner annular liquid level A or A', FIG. 2, the head resulting from the fluid height A or A' being offset by the force generated by the pumping action of the pump elements 62 and 64 on the fluid remaining in the working chamber 48, to prevent any flow-back through the outlet openings 58 and 60. Under this condition, commonly known as the "disengaged mode," the slip between the clutch plate 46 and the housing 23 is greatest.

As the ambient temperature increases due to the warmup of the radiator and engine, the bimetallic thermostatic valve control element 86 will begin to wind up and, since it is restrained at its outer end 92 by the post 94, its inner end 88 will rotate the cooperatively connected pin 78 and the valve member 72, progressively uncovering the inlet ports 66 and 68, as will be described. As a result, fluid will flow through the inlet ports As and 68 back into the working chamber 48, generally progressively increasing the volume therein with increasing temperature. However, referring to FIG. 3, it may be noted that, since the inlet opening 66 and 68 are not spaced 180° apart and, accordingly, are located at different distances from the trailing edges 74 of the valve member 72, as the valve member 72 is rotated in a counterclockwise direction by the bimetallic thermostatic valve control element 86, the opening 66 will be the first to be progressively uncovered by one of the trailing edges 74.

Figure 3:
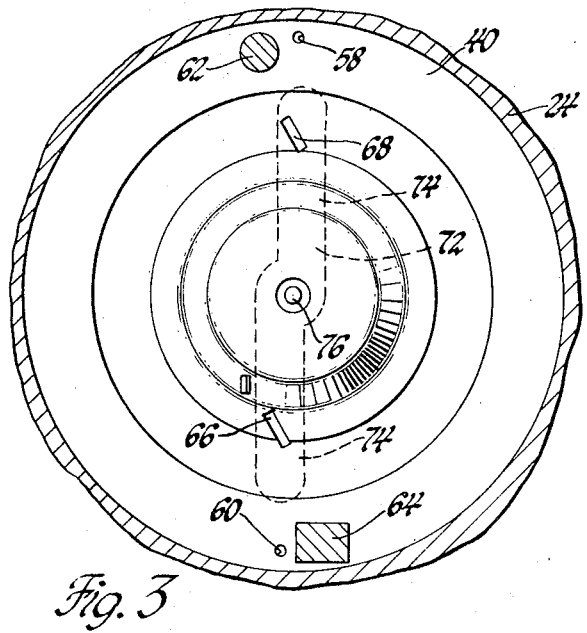
FIG. 3 is a fragmentary end view taken on the plane of the line 3-3 of FIG. 2, as if FIG. 2 were a full round view, and looking in the direction of the arrows.

It may also be noted in FIG. 3 that the inlet port 66 is also positioned radially closer to the center of the clutch 12 than is the other inlet port 68. It may therefore be realized that, as the fluid leaves the reservoir 56 (FIG. 2) and enters the working chamber 48, the fluid level available to the port 66 will, under the action of centrifugal force, move radially outwardly, past the port 66 through which the fluid is flowing, until no more fluid is available to the port 66, the fluid level now being located at the most radially outward corner or edge of the port 66. It is apparent that the shape of either of the openings 66 and 68 could be different from the rectangular shape illustrated.

Figure 4:
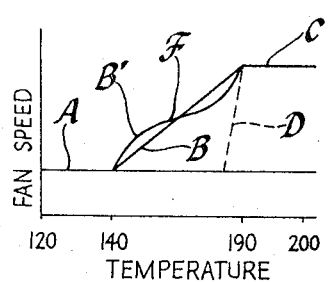
FIG. 4 is a graph illustrating a characteristic of the invention.

Now, depending upon the circumferential and radial location of the other inlet port 68, and the cooperative operation of the temperature-responsive valve member 72, it may be realized that there may either be a period of time when fluid flows through portions of both ports 66 and 68, or a period of time when fluid does not flow through either port, depending upon the characteristics desired, e.g., curve B or B', FIG. 4.

Inasmuch as fan noise is proportional to fan speed, it may be realized that, the more gradual the slope of curve B between the minimum and maximum operating speeds, the latter being represented in FIG. 4 by lines A and C, respectively, the less pronounced will be the change in fan noise. If the latter is gradually increased, it may very well go unnoticed by the occupants of the vehicle, as compared to the noticeable results of a more abrupt changeover, such as, for example, that represented by the broken line D, FIG. 4, typical of an inlet port being fully opened over a narrow temperature range.

Referring now to FIG. 2, it may be noted that, as the fluid from the reservoir 56 progressively fills the operating chamber 48 under the action of centrifugal force, particular increments thereof will fill the wide chamber formed by the annular reservoir groove 70 relatively slowly, after rapidly filling the initial narrow fluid shear space 54 between the rear wall member 24 and the radially outer end portion of the clutch plate 46 and prior to rapidly filling the more radially inner narrow fluid shear space 54 between the ridges 50 and the grooves 52.

At this point it may be realized that, due to a build up of manufacturing tolerances of the elements which form the reservoir 56, the depth of the fluid, indicated by the broken level lines A and A' in FIG. 2, may vary in the reservoir 56 when the level is set at a minimum in the working chamber 48, as represented by the broken line E, FIG. 2. It may also be realized that the clutch 12, at assembly, may be overfilled with fluid, i.e., filled to the high limit of the volume tolerances. Either of these situations, or a combination of both, could cause the preferred level A to be substantially inward of the location shown in FIG. 2, such as represented by the level A'. When such is the case and upon movement of the valve member 72 past the inlet port 66, it may be realized that, without the reservoir groove 70, the fluid level in the working chamber 48 would progress from the level E to a level radially closer to the center of the clutch 12, i.e., overlapping the outermost ridge 50 and groove 52 at a lower temperature. This would occur because all the fluid available to the opening 66 would flow through the opening at any given temperature. With the reservoir groove 70 formed in the wall member 24, the "overfill" of fluid in the reservoir 56, or the difference between levels A and A', as well as any variations in level due to tolerances of the working chamber elements, will first have to fill the volume of the annular groove 70, prior to arriving at the first or most outward ridge 50. This assures that all the fluid which is available to the inlet port 66, and which will have passed through the port 66 into the working chamber 48, will have partially or completely filled the reservoir groove 70, but will not have entered the shear space 54 between the first ridge 50 and groove 52 prior to the initial opening of any part of the other inlet port 68 by virtue of the trailing edge 74 of the valve element 72 moving therepast.

While the reservoir groove 70 is filling, it may be realized that the change in relative speeds between the rear wall member 24 and the clutch plate 46 will be negligible or substantially less than when the shear space 54 is filling, inasmuch as there is a "break" or gap in the "engaging" tendency promoted by viscous fluid in the narrow shear space 54. The latter space 54 is effective, when completely filled with fluid of a predetermined viscosity, to produce the so-called "engaged mode," wherein the rotary speed of the rear wall member 24 approaches that of the clutch plate 46 which is driven directly by the drive shaft 13.

The above-mentioned break in the viscous fluid-promoted drive of the rear wall member 24 and, hence, of the associated fan 16 (FIG. 1), amounts to a delay in the increase in fan speed with increased temperature, such as is illustrated by the leveled-off portion F (FIG. 4) of the curve B', until the reservoir groove 70 has been completely filled. It should be understood that the length of the "flat" or level portion F is not necessarily important but that the incorporation of the reservoir groove 70, which causes the leveling-off process, serves as an intermediate means for preventing the curve B' reaching the highest fan speed curve C at too low a temperature if the clutch 12 happened to be overfilled at assembly or to contain a small and/or narrow reservoir 56, resulting in a deeper volume of fluid in the reservoir 56 than would be desired, such as represented by the level A, as compared to the desired level A.

Throughout the above, the volume of flow through the continually open ports 58 and 60 remains substantially constant, being influenced by the rotary speed of the clutch plate 46, and the working chamber 48 is filled in the manner just described until the inner annular levels in both the working chamber 48 and the annular reservoir 56 are at the level designated by C or C' (FIG. 2), depending upon the corresponding reservoir 56 level A or A', after which the fan speed will remain at its highest constant speed, as represented by the corresponding curve C of FIG. 4.

It is apparent that, as the viscous fluid is admitted to the working chamber 48 with increased temperature, filling the fluid shear space 54 between the oppositely disposed spaced ridge and groove elements 50 and 52, the shear-type fluid drive therebetween will be influenced, and "slip speed," or the difference between the speed of the clutch plate 46 and that of the housing 23, will decrease. So long as the ports 66 and 68 remain open, a fluid circulation process will prevail, i.e., the rotating pump or dam elements 62 and 64 will continue to promote the flow of fluid from the working chamber 48 through the pump outlet openings 58 and 60 to the annular reservoir 56 from whence it will continually return to the working chamber 48 via the variably opening inlet ports 66 and 68.

As indicated, when the cooling requirements are at a maximum, the temperature-responsive valve member 72 will have rotated completely past the openings 66 and 68, permitting the fluid in the chamber 48 and the reservoir 56 to reach a point of equilibrium, i.e., liquid level C or C' in FIG. 2, causing the relatively rotatable drive members 46 and 24 to operate at minimum slip speed and thereby effecting a maximum cooling function, inasmuch as the fan 16 is secured to the outer portion of the rear wall member 24 of the housing 23 (FIG. 1). So long as the inlet ports 66 and 68 remain fully open, the circulation process described above will maintain the level C or C' illustrated in FIG. 2.

It should be apparent that the invention provides improved means for providing a gradual increase in fan speed with increased ambient temperature, such that the resultant increased fan noise would go substantially unnoticed by the occupants of the vehicle, while preventing discrepancies in manufacturing tolerances and fluid "fill" from distributing the desired "gradual increase" arrangement. It should also be apparent that, with the gradual changeover process represented by curve B of FIG. 4, for example, fan speed may level off anywhere between minimum speed A and maximum speed C to coincide with any intermediate constant ambient temperature between the minimum and maximum temperatures of the changeover range, say 140°—180°, whereas, with the narrow temperature range spanned by the curve D, fan speed suddenly changes from minimum fan speed A to maximum fan speed C, with minimal opportunity to level off at an intermediate point.

While but one embodiment of the invention has been shown and described, other modifications thereof are possible.

I claim:

1. A viscous clutch comprising first and second relatively rotatable drive means, said first drive means having an annular operating chamber and a reservoir chamber, fluid shear drive means on said first and second drive means located in said operating chamber operable with a fluid to provide a shear-type fluid drive between said first and second drive means, said operating chamber having outlet opening means at an outer portion and inlet opening means at an inner portion, pump means on one of said drive means to pump fluid from said operating chamber out of said outlet opening means, and compensating means in said annular operation chamber for preventing variations in fluid level in said reservoir chamber when full from submerging a predetermined portion of said fluid shear drive means after all the fluid available to a predetermined portion of said inlet opening means has flowed therethrough to said operating chamber.

2. A viscous clutch comprising first and second relatively rotatable drive members, said first drive member including a first wall, a second wall and a divider wall sealed between said first and second walls providing a working chamber between said divider and second walls and a second chamber between said first and divider walls, fluid shear drive means on said first and second drive members in said working chamber operable with a fluid medium to provide a shear-type fluid drive therebetween, first opening means in said divider wall for providing communication from said working chamber to said second chamber, pump means on one of said drive members for causing said fluid medium to flow from said working chamber through said first opening means to said second chamber, second opening means formed in said divider wall for communicating said fluid medium from said second chamber to said working chamber in a controlled two-step process, and reservoir means formed in one of said drive members for preventing any variations in maximum fluid depth in said second chamber from filling said working chamber beyond a predetermined intermediate annular level along said fluid shear drive means during the first step of said two-step process.

3. A viscous clutch comprising first and second relatively rotatable drive members, said first drive member including a first wall, a second wall and a divider wall sealed between said first and second walls providing a working chamber between said divider and second walls and a second chamber between said first and divider walls, fluid shear drive means on said first and second drive members in said working chamber operable with a fluid medium to provide a shear-type fluid drive therebetween, first opening means in said divider wall for providing communication from said working chamber to said second chamber, pump means on one of said drive members for causing said fluid medium to flow from said working chamber through said first opening means to said second chamber, second temperature-responsive opening means formed in said divider wall for communicating said fluid medium from said second chamber to said working chamber in a controlled two-step process, and compensating means in said working chamber for retarding the shear-type fluid drive increase between said first and second drive members over an intermediate temperature range.

4. A viscous fluid clutch comprising a first member, a second member encompassing said first member and being rotatably supported thereon, an operating chamber forming a viscous shear drive relation between said members, interior walls means cooperating with one of said members to form an annular reservoir therebetween, viscous fluid disposed in said operating chamber and adapted to be transferred to said annular reservoir, an outlet port operatively connected to said operating chamber, pump means operatively connected to said first member for pumping said viscous fluid from said operating chamber through said outlet port, first and second inlet ports communicating with said annular reservoir, valve means for controlling the flow of said viscous fluid into said operating chamber through said first inlet port until the fluid in said reservoir reaches a first predetermined annular level and then through said second inlet port until said fluid in said reservoir reaches a second predetermined annular level, and means in said operating chamber for causing a break in said viscous shear drive relation between said members just prior to the attainment of said first predetermined annular level and until said valve means begins opening said second inlet port.

5. The viscous fluid clutch described in claim 4, and temperature control means for operating said valve means.

6. A viscous fluid clutch comprising an input shaft, a clutch plate secured to said shaft, a fluid clutch housing rotatably mounted on said input shaft, a cover member sealed to said housing, a divider wall secured for rotation with said cover member and said housing and mounted between said cover member and said clutch plate so as to form an annular reservoir with said cover member and a working chamber with said housing, a first opening formed in said divider wall between said working chamber and said annular reservoir, pump means operatively connected to said divider wall for pumping a fluid medium from said working chamber through said first opening to said annular reservoir, second and third openings formed in said divider wall for at times communicating said fluid medium from said annular reservoir and to said working chamber, and temperature-responsive valve means operatively connected to said divider wall for controlling the flow of said fluid medium through said second and third openings, said second and third openings being circumferentially and radially spaced such that temperature-responsive rotary actuation of said valve means will open and second opening first to permit all the fluid available to it to flow therethrough prior to said valve means opening and third opening to permit all the fluid available to it to flow therethrough, and a second annular reservoir operatively connected to said working chamber for compensating for volume variations in said first annular reservoir prior to said valve means opening said third opening.

7. A viscous fluid clutch comprising an input shaft, a clutch plate secured to said shaft, a fluid clutch housing rotatably mounted on said input shaft, a cover member sealed to said housing, a divider wall secured for rotation with said cover member and said housing and mounted between said cover member and said clutch plate so as to form an annular reservoir with said cover member and a working chamber with said housing, a first opening formed in said divider wall between said working chamber and said annular reservoir, pump means operatively connected to said divider wall for pumping a fluid medium from said working chamber through said first opening to said annular reservoir, second and third openings formed in said divider wall for at times communicating said fluid medium from said annular reservoir to said working chamber, and temperature-responsive valve means operatively connected to said divider wall for controlling the flow of said fluid medium through said second and third openings, said second and third openings being circumferentially and radially spaced such that temperature-responsive rotary actuation of said valve means will open said second opening first to permit all the fluid available to it to flow therethrough prior to said valve means opening said third opening to permit all the fluid available to it to flow therethrough, and reservoir means in said working chamber for delaying the increase in speed of said first drive member with an increase in flow of said fluid medium into said working chamber during the latter portion of the total period of flow through said second opening.

8. A viscous fluid clutch comprising an input shaft, a first member secured to said shaft, a second member rotatably mounted on said input shaft, a cover member fixed to said second member such that said first member is relatively rotatable between said second member and said cover member, a divider wall secured for rotation with said cover member and said second member and mounted between said cover member and said first member so as to form an annular reservoir with said cover member and an operating chamber with said second member, a first opening formed in said divider wall between said operating chamber and said annular reservoir, pump means operatively connected to said first and second members for forcing a fluid medium from said operating chamber through said first opening to said annular reservoir, a valve-controlled second opening formed in said divider wall for permitting said fluid medium to flow from a radial inner portion of said annular reservoir to said operating chamber, a valve-controlled third opening formed in said divider wall for permitting said fluid medium to flow from a more radial outer portion of said annular reservoir to said operating chamber, and means operatively connected to said operating chamber for preventing any variations in the annular level of fluid in said radial inner portion from varying the effect of the flow of said variable-leveled fluid through said second opening into said operating chamber.

9. The viscous fluid clutch described in claim 8, and bimetallic thermostat means for actuating said valve-controlled second and third openings.

10. A viscous fluid clutch comprising first and second relatively rotatable drive members, said first drive member including front and rear walls and defining a fluid cavity therebetween, a divider wall sealed between said front and rear walls in said fluid cavity and dividing said fluid cavity into first and second chambers, said second drive member being rotatable in said first chamber, said second drive member and said rear wall having opposed spaced parallel surfaces defining a fluid shear space therebetween and cooperable with a fluid medium in said shear space to provide a shear-type fluid drive therebetween, a first opening formed in said divider wall for providing communication between said first chamber and second chamber, a dam element formed on said divider wall in said first chamber adjacent said first opening for causing said fluid medium to flow through said first opening for varying the volume of fluid medium in said shear space to vary the torque transmitted between said first and second drive members, second and third openings formed in said divider wall for at times communicating said fluid medium from said second chamber to said first chamber, a temperature-responsive valve for sequentially controlling the flow of said fluid medium through said second and third openings to further vary the torque transmitted between said first and second drive members, and reservoir means formed adjacent said first chamber for compensating for variations in the maximum depth of fluid medium in said second chamber when said fluid medium flows through said second opening.

11. The viscous fluid clutch described in claim 10, wherein said reservoir means is an annular groove formed in said rear wall just radially outward of said spaced parallel surfaces defining said fluid shear space.